(12) United States Patent
Kobayashi

(10) Patent No.: US 8,341,560 B2  
(45) Date of Patent: Dec. 25, 2012

(54) METHOD OF DESIGNING SEMICONDUCTOR DEVICE INCLUDING ADJUSTING FOR GATE ANTENNA VIOLATION

(75) Inventor: Naohiro Kobayashi, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 160 days.

(21) Appl. No.: 12/837,061

(22) Filed: Jul. 15, 2010

(65) Prior Publication Data

US 2011/0055776 A1   Mar. 3, 2011

(30) Foreign Application Priority Data

Aug. 28, 2009   (JP) .................. 2009-198355

(51) Int. Cl.  
 G06F 17/50   (2006.01)

(52) U.S. Cl. ............ 716/52; 716/53; 716/54; 716/55; 716/115

(58) Field of Classification Search ......... 716/50–56, 716/106, 110–115  
See application file for complete search history.

(56) References Cited

U.S. PATENT DOCUMENTS

| | | | |
|---|---|---|---|
| 6,557,155 B2 * | 4/2003 | Nagayoshi et al. | 257/206 |
| 6,624,480 B2 * | 9/2003 | Lin et al. | 257/355 |
| 6,862,723 B1 * | 3/2005 | Wang et al. | 716/112 |
| 7,174,527 B2 * | 2/2007 | Itou et al. | 716/52 |
| 7,302,663 B1 * | 11/2007 | Gan et al. | 716/112 |
| 7,721,244 B2 | 5/2010 | Ono | |
| 2001/0010093 A1 * | 7/2001 | Nagayoshi et al. | 716/10 |
| 2003/0075762 A1 * | 4/2003 | Lin et al. | 257/355 |
| 2004/0068710 A1 * | 4/2004 | Miyakawa | 716/11 |
| 2006/0064657 A1 * | 3/2006 | Yamada | 716/5 |
| 2006/0225007 A1 * | 10/2006 | Wang et al. | 716/2 |
| 2007/0136702 A1 * | 6/2007 | Mukai et al. | 716/5 |
| 2007/0234264 A1 * | 10/2007 | Ono | 716/11 |
| 2009/0215254 A1 * | 8/2009 | Aizawa | 438/585 |
| 2010/0001403 A1 * | 1/2010 | Yoda | 257/773 |
| 2011/0055791 A1 * | 3/2011 | Gao | 716/131 |
| 2011/0095367 A1 * | 4/2011 | Su et al. | 257/355 |

FOREIGN PATENT DOCUMENTS

JP   2007-293822 A   11/2007

* cited by examiner

*Primary Examiner* — Nha Nguyen  
(74) *Attorney, Agent, or Firm* — Foley & Lardner LLP (57) ABSTRACT

This is a method of designing a semiconductor device. The method includes: arranging cells used for an electric circuit and wirings respectively connected to gates of the cells in a coordinate region to create chip layout data including the cells, gates and wirings; checking whether each gate included in the chip layout data is in antenna violation; storing antenna violation information in an error-remaining portion library, the antenna violation information representing an antenna violation gate group, in which gates in the antenna violation are contained, in the gates included in the chip layout data; performing lithography simulation for the chip layout data to create predicted layout data after photoresist exposure; selecting the antenna violation gate group from the gates included in the predicted layout data, with reference to the error-remaining library; calculating a calculated value representing a ratio of an area of an wiring of the wirings with respect to an area of a gate of the antenna violation gate group connected to the wiring, for each gate of the antenna violation group; and adjusting a size of the gate of the antenna violation gate group, when the calculated value of the antenna violation group included in the predicted layout data is in a range between a first and second setting value.

20 Claims, 6 Drawing Sheets

METHOD OF DESIGNING SEMICONDUCTOR DEVICE INCLUDING ADJUSTING FOR GATE ANTENNA VIOLATION

INCORPORATION BY REFERENCE

This application is based upon and claims the benefit of priority from Japanese patent application No. 2009-198355 filed on Aug. 28, 2009, the disclosure of which is incorporated herein in its entirety by reference.

BACKGROUND OF THE INVENTION

1. Field of the Invention

The present invention relates to a method of designing a semiconductor device.

2. Description of Related Art

In manufacturing processes of a semiconductor, many processes using plasma are included. The processes such as reactive ion etching, plasma CVD, a film formation and the like are performed with a wafer placed in the plasma.

However, since electric charges exist in the plasma, in these manufacturing processes, the electric charges flow into a conductive portion exposed to a wafer surface and a device is electrically charged. In the case where this conductive portion is connected to a gate electrode (hereinafter referred to as a "gate"), an electric current flows from the gate to a substrate. At that time, a gate insulating film is damaged.

Figure 1:
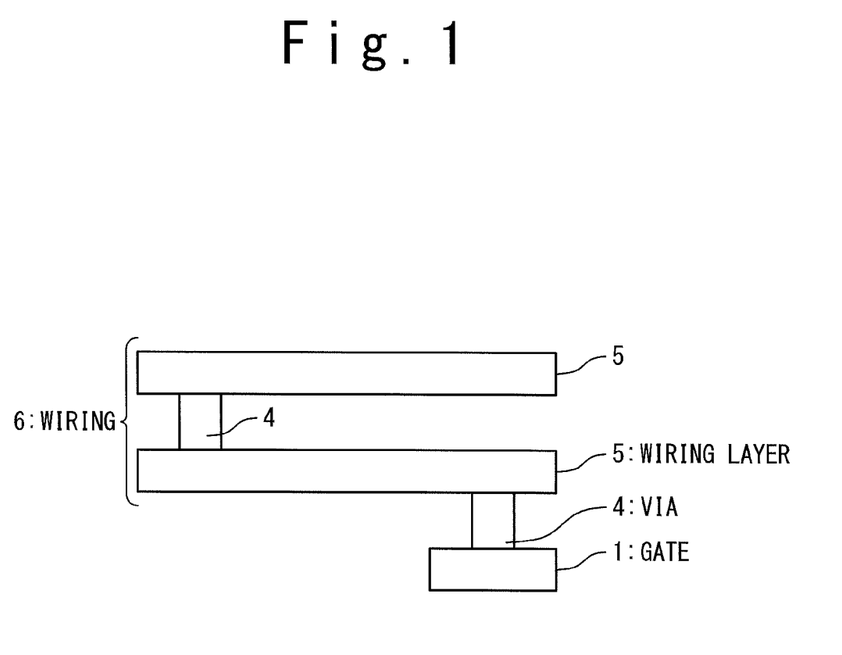
FIG. 1 is a cross sectional view showing a gate and a wiring.

For example, as shown in FIG. 1, a wiring 6 is connected onto a gate 1 of a transistor. The wiring 6 includes a via 4 provided on the gate 1 and a wiring layer 5 provided on the via 4. In the case where this wiring 6 is connected to the gate 1, the electric current flows from the gate 1 to a substrate (not shown). At that time, a gate insulating film below the gate 1 is damaged.

In general, such damage is referred to as "antenna damage".

Therefore, a rule is provided in order to prevent the antenna damage, which is referred to as an "antenna rule". The antenna rule is calculated with a ratio of a gate area in a layout shape to an exposed area of the wiring connected thereto. A violation of the antenna reference when the wiring is carried out is referred to as "antenna violation". In the case where an antenna violation occurs, correction (rearrangement) of the wiring is performed in order to avoid the antenna violation.

For example, in the technique described in Japanese Patent Publication No. JP2007-293822A, the correction of the wiring is performed referring to the gate area.

I have now discovered the following facts.

Figure 2:
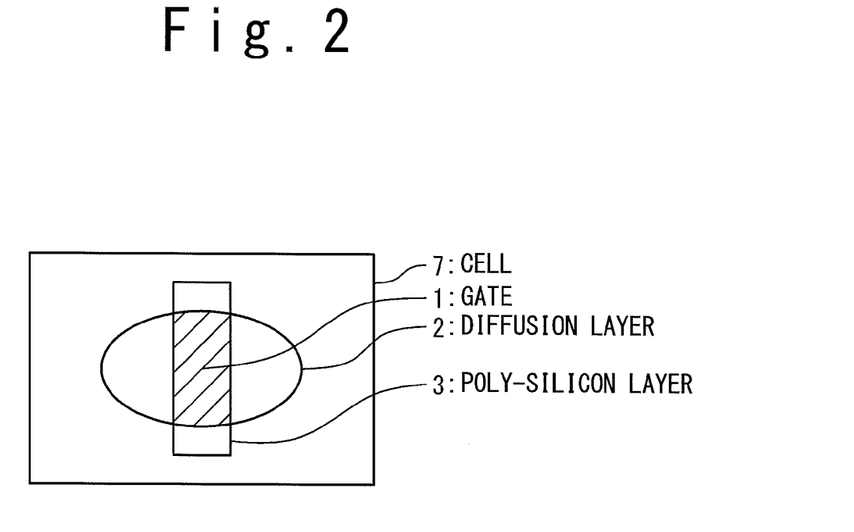
FIG. 2 is a plan view showing a cell.

It is known a method for manufacturing a semiconductor device by configuring a circuit including the transistor mentioned above to be a cell and arranging a plurality of the cells on a chip. For example, as shown in FIG. 2, a cell 7 includes diffusion layers 2 and a poly-silicon layer 3. The gate 1 mentioned above is provided on a portion where the gate insulating film and the poly-silicon layer 3 are overlapped on the substrate surface between the diffusion layers 2.

In recent microprocess, a size of the gate 1 becomes smaller. Even if the same cell is used, a shape of the gate 1 delicately changes depending on a location in which the cell is placed. A reason thereof includes a change in the shape of the gate 1 depending on a peripheral shape in lithography and etching processes.

Figure 3:
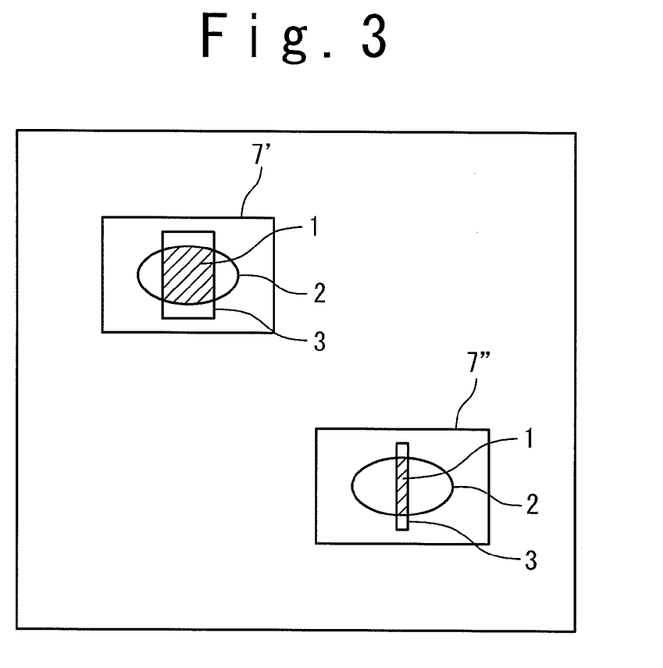
FIG. 3 is a plan view showing cells arranged on a chip.

For example, as shown in FIG. 3, in the case where a cell 7' and a cell 7" are arranged on the chip as the cells 7, the gate 1 of the cell 7' may become larger and the gate 1 of the cell 7" may become smaller depending on the shapes of the peripheral patterns in the same layer as the gate 1.

Since the variation of the shape due to these arranged locations is not considered in checking the antenna reference, it is determined whether or not there is an error based on the shape and area of the layout, and then the correction of all wirings connected to the gates associated with the error is performed. As a result, TAT (Turn Around Time; time required for a loop of a series of steps for developing and manufacturing) is extremely consumed.

SUMMARY

The present invention seeks to solve one or more of the above problems, or to improve upon those problems at least in part.

In one embodiment, a method of designing a semiconductor device includes: arranging a plurality of cells used for an electric circuit and a plurality of wirings respectively connected to a plurality of gates of the plurality of cells in a coordinate region to create chip layout data including the plurality of cells, the plurality of gates and the plurality of wirings; checking whether or not each of the plurality of gates included in the chip layout data is in antenna violation; storing antenna violation information in an error-remaining portion library, the antenna violation information representing an antenna violation gate group, in which gates in the antenna violation are contained, in the plurality of gates included in the chip layout data; performing lithography simulation for the chip layout data to create predicted layout data after photoresist exposure; selecting the antenna violation gate group represented by the antenna violation information from the plurality of gates included in the predicted layout data, with reference to the error-remaining library; calculating a calculated value representing a ratio of an area of an wiring of the plurality of wirings with respect to an area of a gate of the antenna violation gate group connected to the wiring, for each gate of the antenna violation group; and adjusting a size of the gate of the antenna violation gate group, when the calculated value of the antenna violation group included in the predicted layout data is in a range between a first setting value and a second setting value larger than the first setting value.

In another embodiment, an apparatus of designing a semiconductor device includes: an error-remaining portion library; and a control unit configured to arrange a plurality of cells used for an electric circuit and a plurality of wirings respectively connected to a plurality of gates of the plurality of cells in a coordinate region to create chip layout data including the plurality of cells, the plurality of gates and the plurality of wirings. The control unit: checks whether or not each of the plurality of gates included in the chip layout data is in antenna violation; stores antenna violation information in the error-remaining portion library, the antenna violation information representing an antenna violation gate group, in which gates in the antenna violation are contained, in the plurality of gates included in the chip layout data; performs lithography simulation for the chip layout data to create predicted layout data after photoresist exposure; selects the antenna violation gate group represented by the antenna violation information from the plurality of gates included in the predicted layout data, with reference to the error-remaining library; calculates a calculated value representing a ratio of an area of an wiring of the plurality of wirings with respect to an area of a gate of the antenna violation gate group connected to the wiring, for each gate of the antenna violation group; and adjusts a size of the gate of the antenna violation gate group, when the calculated value of the antenna violation group included in the predicted layout data is in a range between a first setting value and a second setting value larger than the first setting value.

In the present invention, an accurate size of a gate can be obtained when a lithography simulation is performed. Therefore, in the case where a calculated value of each group of antenna violation gates which is included in the predicted layout data is within the range between a first setting value and a second setting value, it is not required to perform the correction (rearrangement) of the wirings connected to the group of the antenna violation gates by adjusting the size of each group of the antenna violation gates. Thus, according to the method of designing the semiconductor device of the present invention, TAT can be reduced since it is not necessary to perform the correction of the all wirings when the antenna violation is avoided.

BRIEF DESCRIPTION OF THE DRAWINGS

The above and other objects, advantages and features of the present invention will be more apparent from the following description of certain preferred embodiments taken in conjunction with the accompanying drawings, in which.

DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposed.

A method for designing a semiconductor device according to an embodiment of the present invention will be described in detail below referring to the accompanying drawings.

Figure 4:
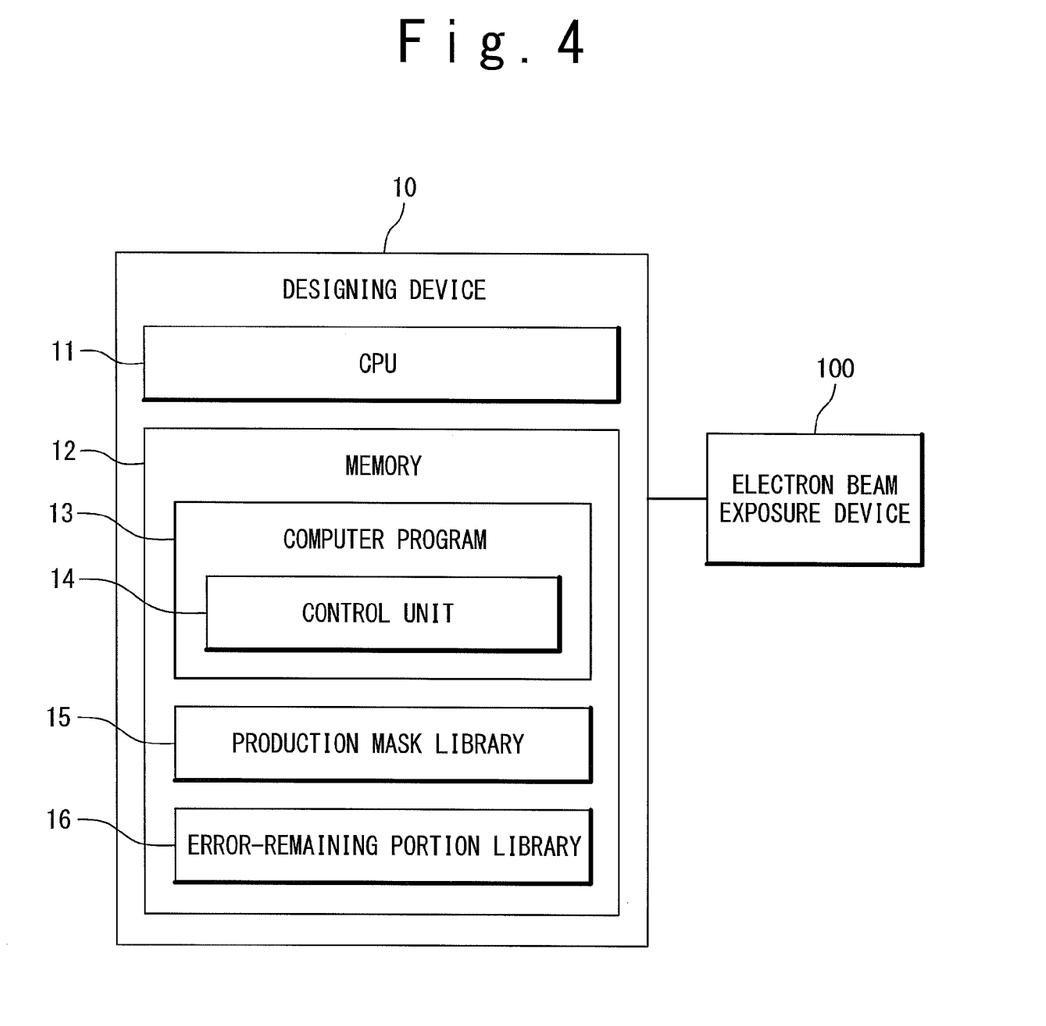
FIG. 4 shows a system to which a method of designing a semiconductor device according to an embodiment of the present invention is applied.

FIG. 4 illustrates a system to which the method for designing the semiconductor device according to the embodiment of the present invention is applied. The system includes a designing device 10 and an electron beam exposure device 100. The electron beam exposure device 100 is a known exposure device and the detailed description thereof will be omitted.

The designing device 10 performs CP (Character Projection) exposure. The CP exposure is the method which was developed in order to reduce an electron beam exposure time and the method for performing electron beam exposure using a CP mask positioned at a predetermined location in the electron beam exposure device 100. The electron beam is radiated to a sample (reticle or wafer) positioned in the electron beam exposure device 100 to perform the electron beam exposure.

The designing device 10, which is a computer, includes a CPU (Central Processing Unit) 11 and a memory 12. In the memory 12, a computer program 13 to be executed by the CPU, a production mask library 15 and an error-remaining portion library 16 are stored. The computer program 13 includes a control unit 14.

Figure 5:
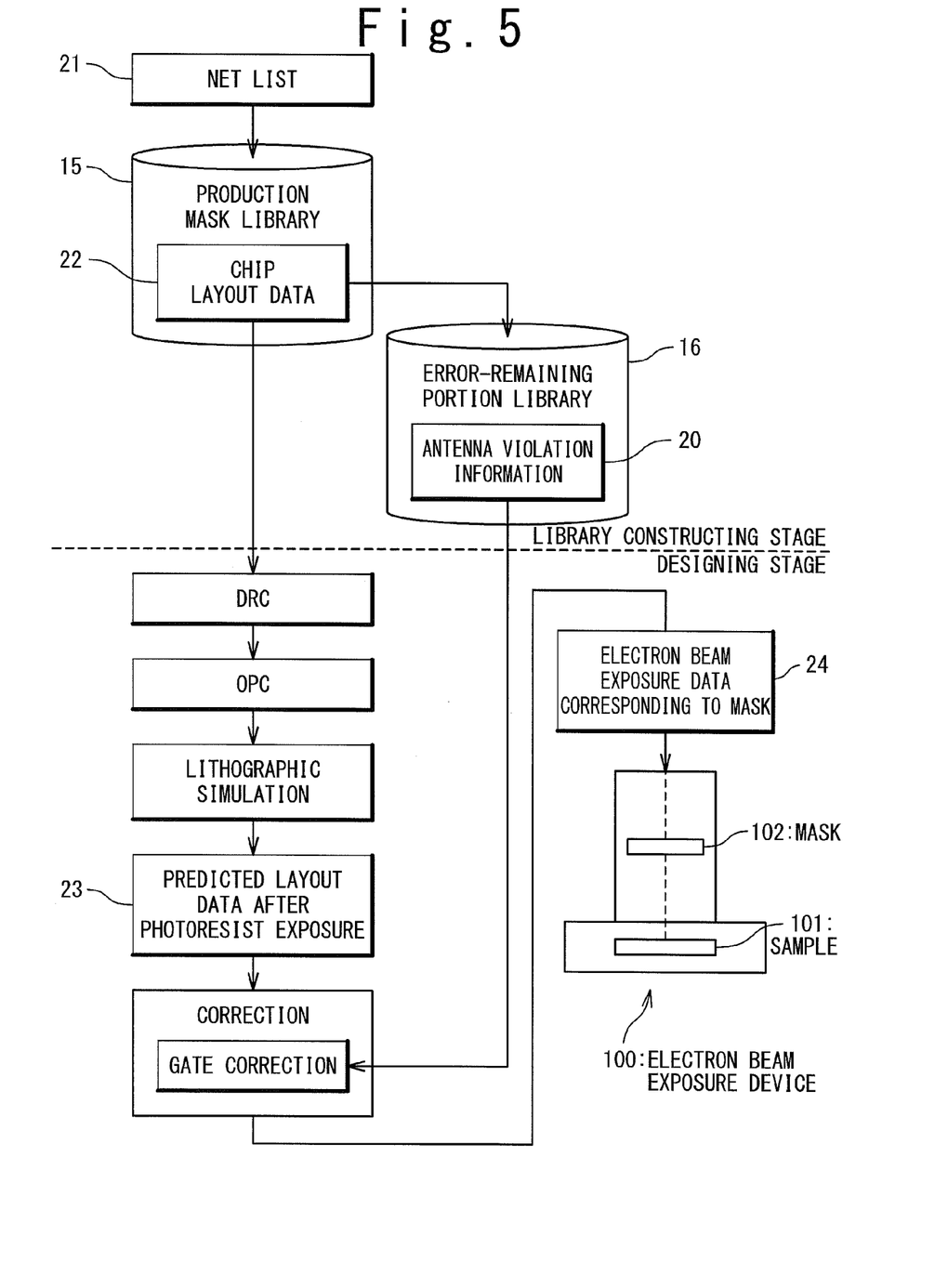
FIG. 5 is a conceptional view of an operation of a designing device of FIG. 4.
Figure 6:
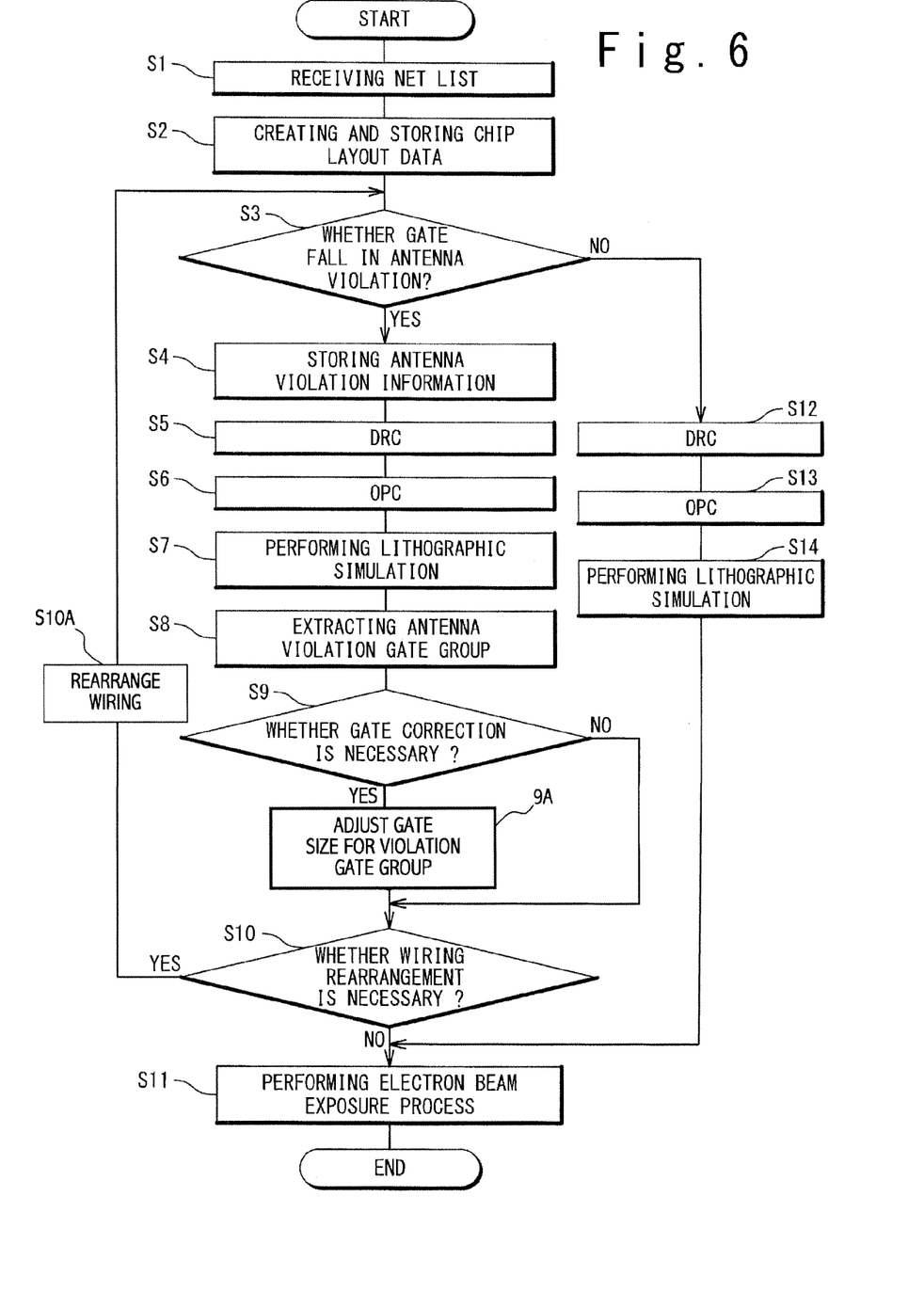
FIG. 6 is a flowchart showing the operation of the designing device of FIG. 4.

Next, an operation of the designing device 10 is described referring to FIGS. 5 to 9. FIG. 5 is a conceptional view showing the operation of the designing device 10. FIG. 6 is a flow chart illustrating the operation of the designing device 10.

The control unit 14 receives a net list 21 (Step S1). The net list 21 represents a plurality of cells 7 used in an electrical circuit and wirings 6 connected to gates 1 thereof. As shown in FIGS. 1 and 2, each of the plurality of cells 7 is a circuit including a transistor. The gate 1 of the transistor is provided on a portion where the gate insulating film and the polysilicon layer 3 are overlapped on the substrate surface between the diffusion layers 2. The wiring 6 is connected to the gate 1. The wiring 6 includes the via 4 and the wiring layer 5.

The control unit 14 places the plurality of cells 7 and the wirings 6 to be connected to the gates 1 thereof represented by the net list 21 in a coordinate region to create chip layout data 22 including this information. The control unit 14 stores chip layout data 22 in the production mask library 15 (Step S2).

The control unit 14 checks whether or not each of the plurality of gates 1 included in the chip layout data 22 falls in the antenna violation (Step S3). Here, the control unit 14 calculates a calculated value Y1 (Y1=L1/G1) which represents a ratio of an area L1 of a wiring 6 with respect to a gate area G1 of a gate 1 connected to the wiring 6. The area L1 represents an area of the wiring 6 connected to each of the plurality of the gates 1 of the chip layout data 22. The gate area G1 represents an area of each of the plurality of the gates 1 of the chip layout data 22. The control unit 14 extracts a group of antenna violation gates (hereinafter referred to as a antenna violation gate group 8) among the plurality of the gates 1. Here, the antenna violation gate is the gate whose calculated value Y1 is more than a first setting value X1.

Figure 7:
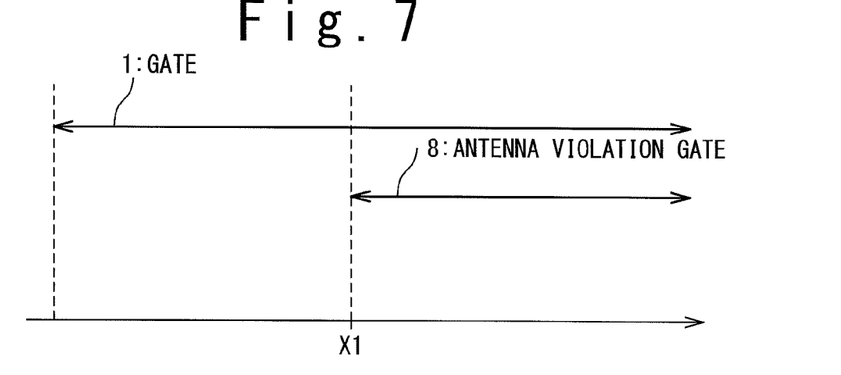
FIG. 7 is a diagram for showing antenna violation.

Now, as shown in FIG. 7, it is assumed that there is the antenna violation gate group 8 whose calculated value Y1 is beyond the first setting value X1 among the plurality of the gates 1 (Step S3: YES).

In this case, the control unit 14 stores antenna violation information 20 in the error-remaining portion library 16 (Step S4). Here, the antenna violation information 20 represents the antenna violation gate group 8 being in the antenna violation among the plurality of the gates 1 included in the chip layout data 22. The antenna violation information 20 includes a name and a coordinate which represent the antenna violation gate group 8.

The control unit 14 performs DRC (Design Rule Check) for the chip layout data 22 stored in the production mask library 15 (Step S5).

The control unit 14 performs OPC (Optical Proximity Correction) for the chip layout data 22 mentioned above (Step S6).

The control unit 14 performs lithography simulation for the chip layout data 22 and creates predicted layout data 23 after photoresist exposure (Step S7).

Referring to the error-remaining portion library 16, the control unit 14 extracts the antenna violation gate group 8 represented by the antenna violation information 20, among the plurality of gates 1 included in the predicted layout data 23 (Step S8).

The control unit 14 checks whether or not the gate correction is necessary (Step S9). In this case, the control unit 14 calculates a calculated value Y2 (Y2=L2/G2) which represents a ratio of an area L2 of a wiring 6 with respect to a gate area G2 of a gate 1 in the antenna violation gate group 8 connected to the wiring 6. Here, the area L2 represents an area of a wiring 6 connected to a gate 1 in the antenna violation gate group 8 in the predicted layout data 23. The gate area G2 represents an area of a gate 1 in the antenna violation gate group 8 in the predicted layout data 23.

Figure 8:
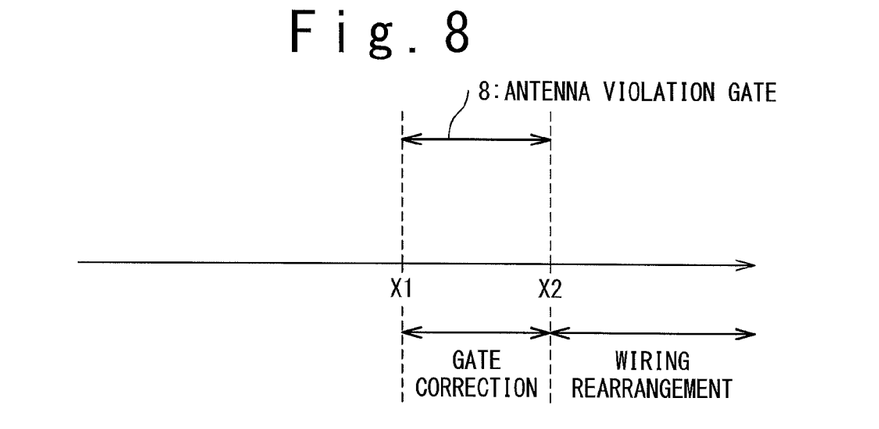
FIG. 8 is a diagram for showing gate correction.

At this time, as shown in FIG. 8, it is assumed that the calculated value Y2 of each gate 1 of the antenna violation gate group 8 which is included in the predicted layout data 23 is in the range between the first setting value X1 and a second setting value X2 larger than the first setting value X1. In this case, the control unit 14 adjusts the size of each gate 1 of the antenna violation gate group 8 (Step S9: YES: gate correction) as shown in Step 9A. Here, in the gate correction, the control unit 14 calculates an area ratio Z which represents a ratio of the gate area G2 of each gate 1 of the antenna violation gate group 8 with respect to a basic gate area G0 (Z=G2/G0). The control unit 14 adjusts the size of each gate 1 of the antenna violation gate group 8 based on an inverse of the area ratio Z (i.e., 1/Z) in the group of the antenna violation gates 8. The size of each gate 1 of the antenna violation gate group 8 is assumed to be a gate width.

In the case described above, since the gate correction is performed for all gates 1 of the antenna violation gate group 8 (Step S9: YES), wiring rearrangement described later (Step S10: YES) is not performed.

The control unit 14 creates electron beam exposure data 24, which corresponds to a mask, with respect to the predicted layout data 23 (Step S11). As shown in FIG. 5, it is assumed that a sample 101 and a mask 102 are positioned (set) in the electron beam exposure device 100. At this time, the control unit 14 controls the electron beam exposure device 100 so that the sample 101 is exposed to the electron beam through the mask 102 based on the mask-corresponding electron beam exposure data 24.

In the method of designing the semiconductor device according to the embodiment of the present invention, the accurate size of the gate 1 is obtained when the lithography simulation is performed. Therefore, in the case where the calculated value Y2 of each gate 1 of the antenna violation gate group 8 included in the predicted layout data 23 is in the range between the first setting value X1 and the second setting value X2, it is not required to perform the correction (rearrangement) of the wirings 6 connected to the gates 1 of the antenna violation gate group 8 by adjusting the size of each gate 1 of the antenna violation gate group 8. Thus, according to the method of designing the semiconductor device according to the embodiment of the present invention, TAT can be reduced since it is not required to perform the correction of all wirings when the antenna violation is avoided.

Figure 9:
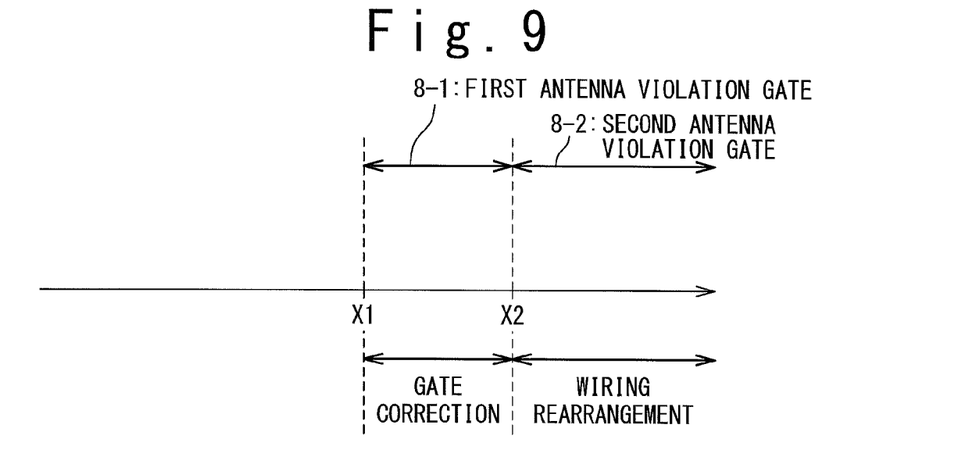
FIG. 9 is a diagram for showing the gate correction and wiring rearrangement.

On the other hand, as shown in FIG. 9, it is assumed that the calculated value Y2 of each gate 1 of a first antenna violation gate group 8-1 in the antenna violation gate group 8 included in the predicted layout data 23 is in the range between the first setting value X1 and the second setting value X2. In this case, the control unit 14 adjusts the size of each gate 1 of the first antenna violation gate group 8-1 (Step S9: YES; gate correction). Here, in the gate correction, the control unit 14 calculates an area ratio Z which represents a ratio of the gate area G2 of each gate 1 of the first antenna violation gate group 8-1 with respect to the basic gate area G0 (Z=G2/G0). The control unit 14 adjusts the size of each gate 1 of the first antenna violation gate group 8-1 base on the inverse of the area ratio Z (i.e., 1/Z) in the antenna violation gate group 8. The size of each gate 1 of the first antenna violation gate group 8 is assumed to be a gate width.

The control unit 14 rearranges the wirings 6 (Step 10A) connected to a second antenna violation gate group 8-2 which are antenna violation gates other than the first antenna violation gate group 8-1 in the antenna violation gate group 8 included in the predicted layout data 23 (Step S10: YES; wiring rearrangement).

After that, the control unit 14 performs Step S3 and subsequent steps using the predicted layout data 23 as the chip layout data 22. In the case where there is no antenna violation in each of the plurality of gates 1 included in the chip layout data 22 (Step S3: NO), the control unit 14 performs the same steps as Step S5 to Step S7 described above (Step S12 to Step S14). That is, the predicted layout data 23 is created form the chip layout data 22. Subsequently, the control unit 14 performs the abovementioned Step S11.

In addition, even in the case where, for all of the gates 1 of the antenna violation gate group 8, the gate correction is not performed (Step S9: NO) and only the wiring rearrangement is performed (Step S10: YES), the control unit 14 performs Step S3 and subsequent steps. The explanation for the subsequent steps is same as the above description.

In the method of designing the semiconductor device according to the embodiment of the present invention, the accurate size of the gate 1 is obtained when the lithography simulation is performed. Therefore, in the case where the calculated value Y2 of each gate 1 of the first antenna violation gate group 8-1 which is included in the predicted layout data 23 is in the range between the first setting value X1 and the second setting value X2, it is not required to perform the correction (rearrangement) of the wirings 6 connected to the gates 1 of the first antenna violation gate group 8-1 by adjusting the size of each gate 1 of the antenna violation gate group 8-1. Thus, according to the method of designing the semiconductor device according to the embodiment of the present invention, TAT can be reduced since it is not required to perform the correction of all wirings when the antenna violation is avoided.

It is apparent that the present invention is not limited to the above embodiment, but may be modified and changed without departing from the scope and spirit of the invention.

Although the present invention has been described above in connection with several exemplary embodiments thereof, it would be apparent to those skilled in the art that those exemplary embodiments are provided solely for illustrating the present invention, and should not be relied upon to construe the appended claims in a limiting sense.

What is claimed is:

1. A method of designing a semiconductor device comprising:
   arranging, by using a computer, a plurality of cells used for an electric circuit and a plurality of wirings respectively connected to a plurality of gates of said plurality of cells in a coordinate region to create chip layout data including said plurality of cells, said plurality of gates and said plurality of wirings;
   checking whether or not each of said plurality of gates included in said chip layout data is in antenna violation;
   storing antenna violation information in an error-remaining portion library, said antenna violation information representing an antenna violation gate group, in which gates in said antenna violation are contained, in said plurality of gates included in said chip layout data;

performing lithography simulation for said chip layout data to create predicted layout data after photoresist exposure;

selecting said antenna violation gate group represented by said antenna violation information from said plurality of gates included in said predicted layout data, with reference to said error-remaining library;

calculating a calculated value representing a ratio of an area of a wiring of said plurality of wirings with respect to an area of a gate of said antenna violation gate group, selected from said plurality of gates included in said predicted layout data, connected to said wiring, for each gate of said antenna violation group; and adjusting a size of said gate of said antenna violation gate group, when said calculated value of said antenna violation group included in said predicted layout data is in a range between a first setting value and a second setting value larger than said first setting value.

2. The method of designing a semiconductor device according to claim 1, wherein said adjusting step includes:

calculating an area ratio representing a ratio of an area of said gate of said antenna violation gate group with respect to an area of a basic gate, and adjusting said size of said gate of said antenna violation gate group, based on an inverse of said area ratio, for said each gate of said antenna violation group.

3. The method of designing a semiconductor device according to claim 1, further comprising:

creating electron beam exposure data corresponding to a mask with respect to said predicted layout data; and controlling an electron beam exposure device so that a sample is exposed to an electron beam through a mask based on said electron beam exposure data when said sample and said mask are set in said electron beam exposure device.

4. The method of designing a semiconductor device according to claim 1, further comprising:

adjusting a size of a gate of a first antenna violation gate group in said antenna violation gate group included in said predicted layout data, when said calculated value of said first antenna violation gate group is in said range between said first setting value and said second setting value;

rearranging wirings of said plurality of wirings connected to gates of a second antenna violation gate group other than said first antenna violation gate group in said antenna violation gate group included in said predicted layout data; and checking again whether or not each of said plurality of gates included in said predicted layout data as said chip layout data is in said antenna violation.

5. The method of designing a semiconductor device according to claim 4, wherein said step of adjusting said size of said gate of said first antenna violation gate group, includes:

calculating an area ratio representing a ratio of an area of said gate of said first antenna violation gate group with respect to an area of a basic gate, and adjusting said size of said gate of said first antenna violation gate group, based on an inverse of said area ratio, for each gate of said first antenna violation group.

6. The method of designing a semiconductor device according to claim 4, further comprising:

creating electron beam exposure data corresponding to a mask with respect to said predicted layout data when there is not said antenna violation of said plurality of gates included in said chip layout data and said predicted layout data is created based on said chip layout data; and controlling an electron beam exposure device so that a sample is exposed to an electron beam through a mask based on said electron beam exposure data when said sample and said mask are set in said electron beam exposure device.

7. The method of designing a semiconductor device according to claim 1, wherein said checking step includes:

calculating a value representing a ratio of an area of a wiring of said plurality of wirings with respect to an area of one of said plurality of gates connected to said wiring, for each of said plurality of gates in said chip layout data; and selecting said antenna violation gate group in which said value is larger than said first setting value from said plurality of gates.

8. The method of designing a semiconductor device according to claim 1, further comprising:

performing OPC (Optical Proximity Correction) for said chip layout data, wherein after said step of performing said OPC for said chip layout data, said step of performing said lithography simulation for said chip layout data to create said predicted layout data is executed.

9. The method of designing a semiconductor device according to claim 8, further comprising:

performing DRC (Design Rule Check) for said chip layout data, wherein after performing said DRC for said chip layout data, said step of performing said OPC for said chip layout data is executed.

10. The method of designing a semiconductor device according to claim 9, further comprising:

storing said chip layout data in a production mask library, wherein said performing said DRC step, includes:

performing said DRC for said chip layout data stored in said production mask library.

11. An apparatus of designing a semiconductor device comprising:

an error-remaining portion library; and a control unit configured to arrange a plurality of cells used for an electric circuit and a plurality of wirings respectively connected to a plurality of gates of said plurality of cells in a coordinate region to create chip layout data including said plurality of cells, said plurality of gates and said plurality of wirings, wherein said control unit:

checks, via a processor, whether or not each of said plurality of gates included in said chip layout data is in antenna violation, stores, via the processor, antenna violation information in said error-remaining portion library, said antenna violation information representing an antenna violation gate group, in which gates in said antenna violation are contained, in said plurality of gates included in said chip layout data, performs, via the processor, lithography simulation for said chip layout data to create predicted layout data after photoresist exposure, selects, via the processor, said antenna violation gate group represented by said antenna violation information from said plurality of gates included in said predicted layout data, with reference to said error-remaining library, calculates, via the processor, a calculated value representing a ratio of an area of a wiring of said plurality of wirings with respect to an area of a gate of said antenna violation gate group, selected from said plurality of gates included in said predicted layout data connected to said wiring, for each gate of said antenna violation group, and adjusts, via the processor, a size of said gate of said antenna violation gate group, when said calculated value of said antenna violation group included in said predicted layout data is in a range between a first setting value and a second setting value larger than said first setting value.

12. The apparatus of designing a semiconductor device according to claim 11, wherein when adjusting said size of said gate of said antenna violation gate group, said control unit:

calculates an area ratio representing a ratio of an area of said gate of said antenna violation gate group with respect to an area of a basic gate, and adjusts said size of said gate of said antenna violation gate group, based on an inverse of said area ratio, for said each gate of said antenna violation group.

13. The apparatus of designing a semiconductor device according to claim 11, wherein said control unit:

creates electron beam exposure data corresponding to a mask with respect to said predicted layout data, and controls an electron beam exposure device so that a sample is exposed to an electron beam through a mask based on said electron beam exposure data when said sample and said mask are set in said electron beam exposure device.

14. The apparatus of designing a semiconductor device according to claim 11, wherein said control unit:

adjusts a size of a gate of a first antenna violation gate group in said antenna violation gate group included in said predicted layout data, when said calculated value of said first antenna violation gate group is in said range between said first setting value and said second setting value, rearranges wirings of said plurality of wirings connected to gates of a second antenna violation gate group other than said first antenna violation gate group in said antenna violation gate group included in said predicted layout data, and checks again whether or not each of said plurality of gates included in said predicted layout data as said chip layout data is in said antenna violation.

15. The apparatus of designing a semiconductor device according to claim 14, wherein when adjusting said size of said gate of said first antenna violation gate group, said control unit:

calculating an area ratio representing a ratio of an area of said gate of said first antenna violation gate group with respect to an area of a basic gate, and adjusting said size of said gate of said first antenna violation gate group, based on an inverse of said area ratio, for each gate of said first antenna violation group.

16. The apparatus of designing a semiconductor device according to claim 14, wherein said control unit:

creates electron beam exposure data corresponding to a mask with respect to said predicted layout data when there is not said antenna violation of said plurality of gates included in said chip layout data and said predicted layout data is created based on said chip layout data, and controls an electron beam exposure device so that a sample is exposed to an electron beam through a mask based on said electron beam exposure data when said sample and said mask are set in said electron beam exposure device.

17. The apparatus of designing a semiconductor device according to claim 11, wherein when checking whether or not each of said plurality of gates is in said antenna violation, said control unit:

calculates a value representing a ratio of an area of a wiring of said plurality of wirings with respect to an area of one of said plurality of gates connected to said wiring, for each of said plurality of gates in said chip layout data, and selects said antenna violation gate group in which said value is larger than said first setting value from said plurality of gates.

18. The apparatus of designing a semiconductor device according to claim 11, wherein said control unit:

performs OPC (Optical Proximity Correction) for said chip layout data, and performs said lithography simulation for said chip layout data to create said predicted layout data after performing said OPC for said chip layout data.

19. The apparatus of designing a semiconductor device according to claim 18, wherein said control unit:

performs DRC (Design Rule Check) for said chip layout data, and performs said OPC for said chip layout data after performing said DRC for said chip layout data.

20. The apparatus of designing a semiconductor device according to claim 19, further comprising:

a production mask library;

wherein said control unit:

stores said chip layout data in said production mask library, and performs said DRC for said chip layout data stored in said production mask library.

* * * * *